US008817192B2

(12) United States Patent
Yamane et al.

(10) Patent No.: US 8,817,192 B2
(45) Date of Patent: Aug. 26, 2014

(54) IMAGE PROCESSING APPARATUS, IMAGE PROCESSING METHOD, AND IMAGE PROCESSING SYSTEM

(75) Inventors: Masaaki Yamane, Kanagawa (JP); Shozo Into, Kanagawa (JP); Masanori Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 13/077,343

(22) Filed: Mar. 31, 2011

(65) Prior Publication Data

US 2011/0249186 A1  Oct. 13, 2011

(30) Foreign Application Priority Data

Apr. 8, 2010  (JP) ................. P2010-089812

(51) Int. Cl.
H04N 9/76 (2006.01)
H04N 9/74 (2006.01)
H04N 9/67 (2006.01)
H04N 5/268 (2006.01)
H04N 5/222 (2006.01)

(52) U.S. Cl.
USPC .......... 348/584; 348/598; 348/590; 348/659; 348/705; 348/706; 348/722

(58) Field of Classification Search
USPC .......... 348/584, 598, 590, 659, 705–706, 722
See application file for complete search history.

(56) References Cited

U.S. PATENT DOCUMENTS

| 4,698,682 | A | * | 10/1987 | Astle | 348/586 |
| 4,858,011 | A | * | 8/1989 | Jackson et al. | 348/705 |
| 5,471,592 | A | * | 11/1995 | Gove et al. | 709/213 |
| 5,684,543 | A | * | 11/1997 | Kobayashi | 348/705 |
| 5,923,384 | A | * | 7/1999 | Enomoto et al. | 348/705 |
| 5,995,505 | A | * | 11/1999 | Nakasaka et al. | 370/360 |
| 6,002,455 | A | * | 12/1999 | Enomoto et al. | 348/425.3 |
| 6,020,931 | A | * | 2/2000 | Bilbrey et al. | 348/584 |
| 6,154,600 | A | * | 11/2000 | Newman et al. | 386/281 |
| 6,188,381 | B1 | * | 2/2001 | van der Wal et al. | 345/581 |
| 6,281,941 | B1 | * | 8/2001 | Windrem | 348/585 |
| 6,400,410 | B1 | * | 6/2002 | Timmer et al. | 348/571 |
| 6,437,834 | B1 | * | 8/2002 | Tagami | 348/705 |
| 6,630,964 | B2 | * | 10/2003 | Burns et al. | 348/554 |
| 7,190,412 | B2 | * | 3/2007 | Ellett | 348/705 |
| 7,319,493 | B2 | * | 1/2008 | Hata et al. | 348/584 |
| 7,420,622 | B2 | * | 9/2008 | Higashi et al. | 348/578 |
| 7,920,557 | B2 | * | 4/2011 | Moote | 370/389 |
| 7,975,085 | B2 | * | 7/2011 | Hattori et al. | 710/104 |
| 7,996,592 | B2 | * | 8/2011 | Kim et al. | 710/244 |
| 8,111,334 | B2 | * | 2/2012 | Mizutani et al. | 348/705 |
| 2001/0024240 | A1 | * | 9/2001 | Fujita et al. | 348/705 |
| 2007/0143576 | A1 | * | 6/2007 | Ellgen et al. | 712/10 |
| 2009/0244368 | A1 | | 10/2009 | Noguchi et al. | |
| 2009/0244393 | A1 | * | 10/2009 | Mizutani et al. | 348/705 |
| 2009/0303389 | A1 | * | 12/2009 | Nojima et al. | 348/659 |
| 2010/0182508 | A1 | * | 7/2010 | Casper et al. | 348/578 |
| 2010/0259687 | A1 | * | 10/2010 | Into | 348/659 |

FOREIGN PATENT DOCUMENTS

JP  2009 253387  10/2009
JP  2009 253388  10/2009

* cited by examiner

Primary Examiner — Brian Yenke
(74) Attorney, Agent, or Firm — Sony Corporation

(57) ABSTRACT

There is provided an image processing apparatus including: a plurality of signal processing circuits that compose video signals; and a communication path that connects the plurality of signal processing circuits, wherein any one of the plurality of signal processing circuits composes a video signal obtained by composition by the signal processing circuit, and a video signal obtained by composition by another signal processing circuit supplied from the another signal processing circuit via the communication path.

16 Claims, 16 Drawing Sheets

IMAGE PROCESSING APPARATUS, IMAGE PROCESSING METHOD, AND IMAGE PROCESSING SYSTEM

BACKGROUND OF THE INVENTION

1. Field of the Invention

The present invention relates to an image processing apparatus, an image processing method, and an image processing system.

2. Description of the Related Art

In the past, a signal processing circuit called M/E (Mix and Effect) is mounted on an image processing apparatus used for video editing performed by a TV broadcast station. Such a signal processing circuit performs, for example, keying processing for composing a plurality of input video signals.

Further, Japanese Patent Application Laid-Open Nos. 2009-253387 and 2009-253388 disclose an image processing apparatus on which two signal processing circuits are mounted. According to this image processing apparatus, the two signal processing circuits can simultaneously process video signals of two systems, and therefore such an image processing apparatus is efficient. For example, a video signal corresponding to an even-numbered line that constitutes 1 frame can be processed by one of the signal processing circuits, and a video signal corresponding to an odd-numbered line that constitutes 1 frame can be processed by the other signal processing circuit. Similarly, a signal for a left eye in 3-dimensional video signals can be processed by one of the signal processing circuits, and a signal for a right eye can be processed by the other signal processing circuit.

SUMMARY OF THE INVENTION

Here, as described above, in the image processing apparatus on which two signal processing circuits are mounted, by using the two signal processing circuits in series, composition processing such as keying can be performed. Specifically, a plurality of video signals are composed by one of the signal processing circuits and the video signals after composition processing are supplied to the other signal processing circuit, and the composition processing can be further applied to the supplied video signals by the other signal processing circuit.

However, as described above, if the two signal processing circuits are used in series, after signal processing is performed by one of the signal processing circuits, signal processing by the other signal processing circuit is started, thus involving an issue that an overall processing time is prolonged.

In light of the foregoing, it is desirable to provide a novel and improved image processing apparatus, image processing method, and image processing system capable of shortening a processing time for composing videos.

According to an embodiment of the present invention, there is provided an image processing apparatus including a plurality of signal processing circuits that compose video signals, and a communication path that connects the plurality of signal processing circuits. Any one of the plurality of signal processing circuits composes a video signal obtained by composition by the signal processing circuit, and a video signal obtained by composition by another signal processing circuit and supplied from the another signal processing circuit via the communication path.

The signal processing circuit may include a first video composition unit, and a second video composition unit disposed at a rear stage of the first video composition unit, and the second video composition unit may compose a video signal obtained by composition by the first video composition unit, and a video signal supplied from the another signal processing circuit via the communication path.

The signal processing circuit may further include a third video composition unit that composes a video signal obtained by composition using the second video composition unit and a background video signal, and the third video composition unit may be disposed at a next stage of the second video composition unit.

The image processing apparatus may further include a controller that controls an operation of the plurality of signal processing circuits. The controller may switch operation modes of the plurality of signal processing circuits to other operation mode, such as a coupling operation mode, in which the signal processing circuit composes video signals supplied from another signal processing circuit.

The other operation mode may include an independent operation mode in which each one of the plurality of signal processing circuits performs different processing independently.

The other operation mode may include an interlocking operation mode in which different signal processing circuits respectively perform processing of a video signal corresponding to an odd-numbered line that constitutes one frame, and processing of a video signal corresponding to an even-numbered line that constitutes the aforementioned one frame.

The other operation mode may include a three dimensional interlocking operation mode in which different signal processing circuits respectively perform processing of a signal for a left eye and processing of a signal for a right eye in three-dimensional video signals.

The controller may specify a composition method performed by the second video composition unit, for composing a video signal obtained by composition by the first video composition unit and a video signal supplied from the another signal processing circuit via the communication path.

According to another embodiment of the present invention, there is provided an image processing method including the steps of composing video signals by each one of a plurality of signal processing circuits, supplying a video signal obtained by composition by another signal processing circuit, to any one of the plurality of signal processing circuits, and composing, by using the signal processing circuit, a video signal obtained by composition by the signal processing circuit and a video signal supplied from the another signal processing circuit.

According to another embodiment of the present invention, there is provided an image processing system including, an operation unit, a plurality of signal processing circuits that compose video signals, a communication path that connects the plurality of signal processing circuits, and a cross point unit into which a plurality of video signals are input and out of which each one of the plurality of video signals is output to any one of output destinations including the plurality of signal processing circuits. Any one of the plurality of signal processing circuits composes a video signal obtained by composition by the signal processing circuit and a video signal obtained by composition by another signal processing circuit supplied from the another signal processing circuit via the communication path.

As described above, according to an embodiment of the present invention, the processing time for composing videos can be shortened.

DETAILED DESCRIPTION OF THE EMBODIMENT

Figure 1:
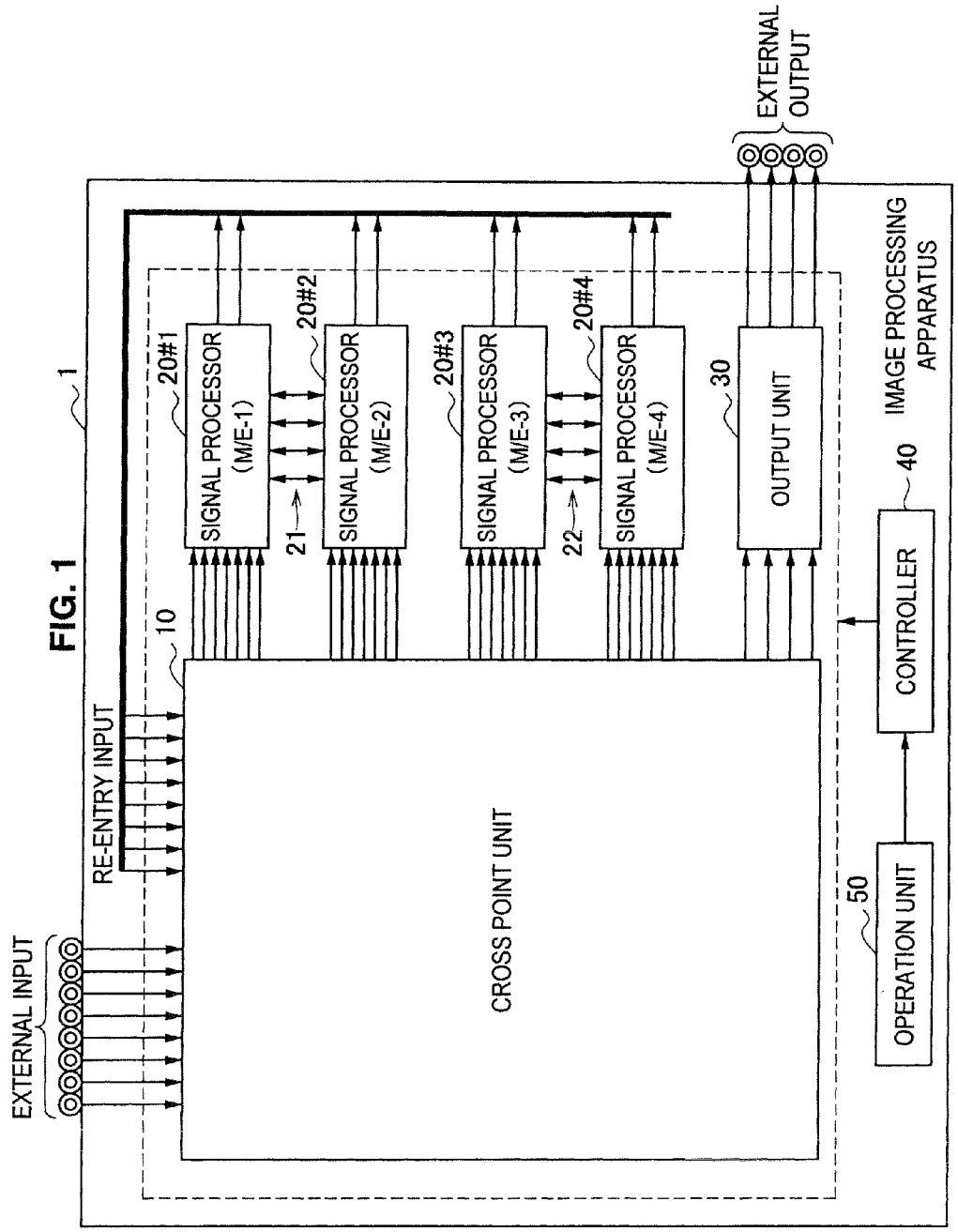
FIG. 1 is an explanatory view showing a structure of an image processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, in this specification and in the drawings, distinction is made regarding a plurality of constituent elements having substantially the same functional structures, by assigning different numerals after the same signs in some cases. For example, a plurality of structures having substantially the same functional structures are distinguished from each other as necessary, by assigning signs and numerals in such a manner as signal processors 20#1, 20#2, and 20#3. However, when each one of the plurality of constituent elements having substantially the same functional structures does not particularly have to be distinguished from each other, only the same signs are assigned thereto. For example, when signal processors 20#1, 20#2, and 20#3 do not particularly have to be distinguished from each other, these processors are simply called signal processors 20.

Further, "DETAILED DESCRIPTION OF THE EMBODIMENT" of the present invention will be described in accordance with an order of items shown below.

1. Gist of the image processing apparatus
(Independent operation mode)
(Interlocking operation mode)
(Coupling operation mode)

2. Control for realizing each operation mode
(Independent operation mode)
(Interlocking operation mode)
(Coupling operation mode)

3. Detailed structure of the signal processor of the image processing apparatus

4. Operation of the image processing apparatus

5. Conclusion

1. Gist of the Image Processing Apparatus

First, the structure of an image processing apparatus 1 according to an embodiment of the present invention will be described with reference to FIG. 1.

FIG. 1 is an explanatory view showing the structure of the image processing apparatus 1 according to the embodiment of the present invention. As shown in FIG. 1, the image processing apparatus 1 according to the embodiment of the present invention includes a cross point unit 10; a plurality of signal processors 20#1 to 20#4; an output unit 30; a controller 40; and an operation unit 50. Such an image processing apparatus 1 is called a switcher apparatus or an image processing system in some cases.

Based on an operation by a user performed to the operation unit 50, the controller 40 controls operations of the cross point unit 10, the plurality of signal processors 20#1 to 20#4, the output unit 30, and the like. For example, based on the operation by the user to the operation unit 50, the controller 40 controls an output destination of the video signal input into the cross point unit 10, a processing method of a key signal in the signal processor 20, a type of transition, and the like.

Note that the operation unit 50 can be realized by various interfaces for operation. For example, the operation unit 50 may be constituted of a keyboard, a touch panel, buttons, switches, a lever, or a mouse.

A video signal from outside and a re-entry signal from each signal processor 20 are input into the cross point unit 10, and the cross point unit 10 outputs a signal selected from these video signals to the signal processors 20#1 to 20#4 or the output unit 30, in accordance with the control by the controller 40.

The signal processor 20 (signal processing circuit) applies composition processing to the video signal input from the cross point unit 10 in accordance with the control by the controller 40. The signal processor 20 functions, for example, as M/E (Mix and Effect). Note that although circuit structures and functions of the signal processors 20#1 to 20#4 are the same, each one of the signal processors 20#1 to 20#4 performs different processing depending on an operation mode as will be described later.

Further, in the image processing apparatus 1 according to this embodiment, the signal processors 20 are mutually connected to each other. Specifically, as shown in FIG. 1, the signal processor 20#1 and the signal processor 20#2 are internally connected by a communication path 21, and the signal processor 20#3 and the signal processor 20#4 are internally connected by a communication path 22. Each signal processor 20 can realize the coupling operation mode as will be described later, by transmitting/receiving an internal signal via the communication path 21 or the communication path 22.

The output unit 30 converts signals input from the cross point unit 10 to a format in compliance with a signal standard, by matching phases of the signals, and outputs them to outside.

Such an image processing apparatus 1 can selectively execute any one of the independent operation mode, the interlocking operation mode, and the coupling operation mode by controlling operations of the signal processors 20#1 to 20#4.

The independent operation mode, the interlocking operation mode, and the coupling operation mode will be described hereafter.

(Independent Operation Mode)

The independent operation mode is an operation mode in which each one of the signal processors 20#1 to 20#4 performs independent operation. According to the independent operation mode, for example, video processing shown in FIG. 2 is realized.

Figure 2:
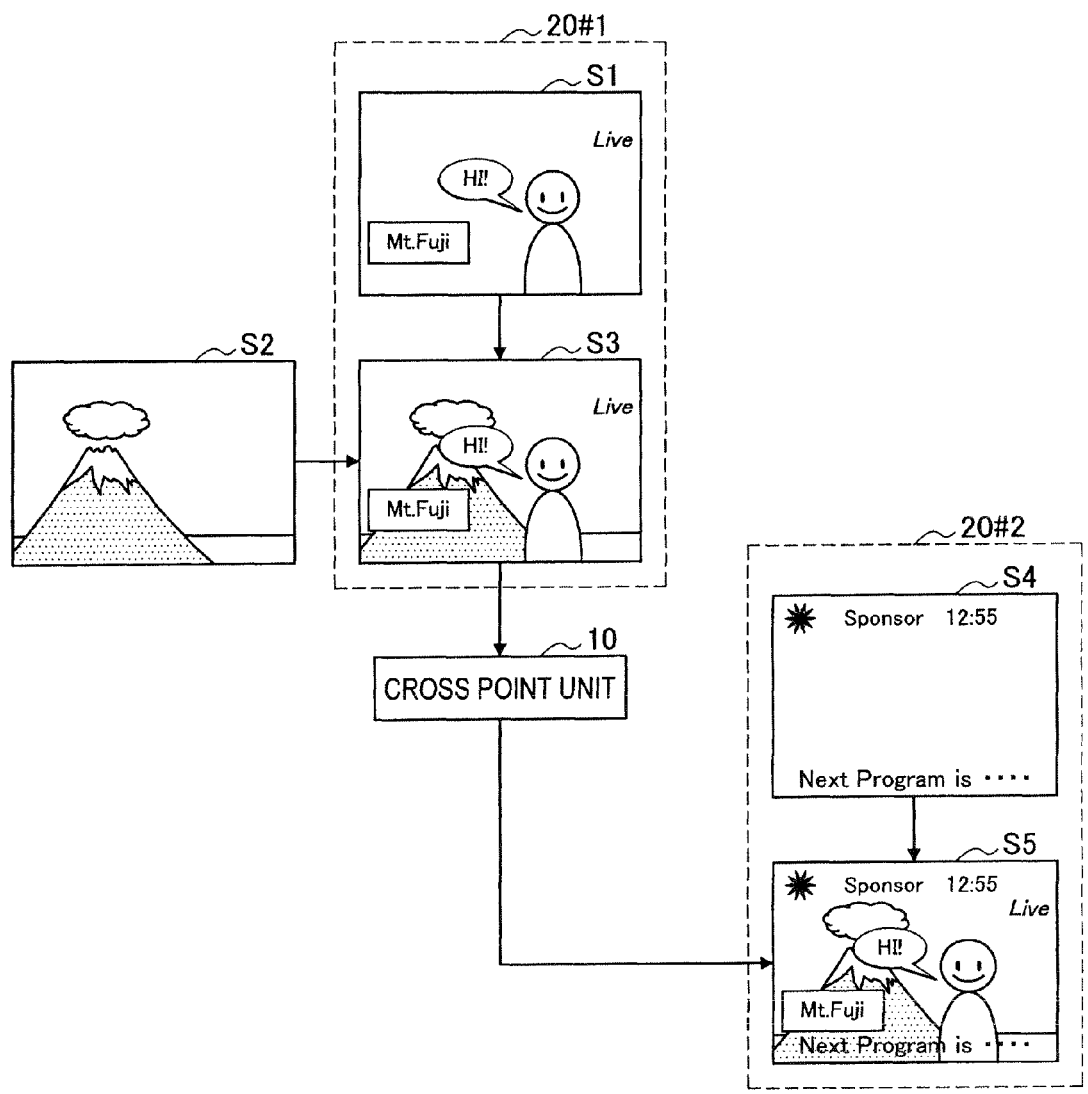
FIG. 2 is an explanatory view showing a specific example of video processing by an independent operation mode.

FIG. 2 is an explanatory view showing a specific example of the video processing by the independent operation mode. As shown in FIG. 2, in the independent operation mode, first, the signal processor 20#1 acquires a composite video signal S1 by composing a plurality of video signals supplied from the cross point unit 10. Then, the signal processor 20#1 composes the composite video signal S1 and a background video signal S2, to thereby acquire a composite video signal S3. The composite video signal S3 is re-entered into the cross point unit 10.

Thereafter, a plurality of video signals and the composite video signal S3 are input into the signal processor 20#2 from the cross point unit 10. Then, the signal processor 20#2 can compose the plurality of video signals to acquire a composite video signal S4, and further compose the composite video signal S4 and the composite video signal S3 to acquire a composite video signal S5.

Thus, according to the independent operation mode, a certain signal processor performs composition processing, and inputs composite video signals obtained by this composition processing into other signal processor, and the other signal processor further applies composition processing to the composite video signals to thereby further compose the video signals. Namely, by using a plurality of signal processors 20 in series, one signal processor 20 can compose the video signals of the number exceeding the composable number.

(Interlocking Operation Mode)

The interlocking operation mode is an operation mode in which the video signals to be processed are supplied dispersively to a plurality of signal processors, and the plurality of signal processors are handled as one signal processing circuit. According to the interlocking operation mode, the progressive video signal can be processed, for example, as shown in FIGS. 3 and 4.

Figure 3:
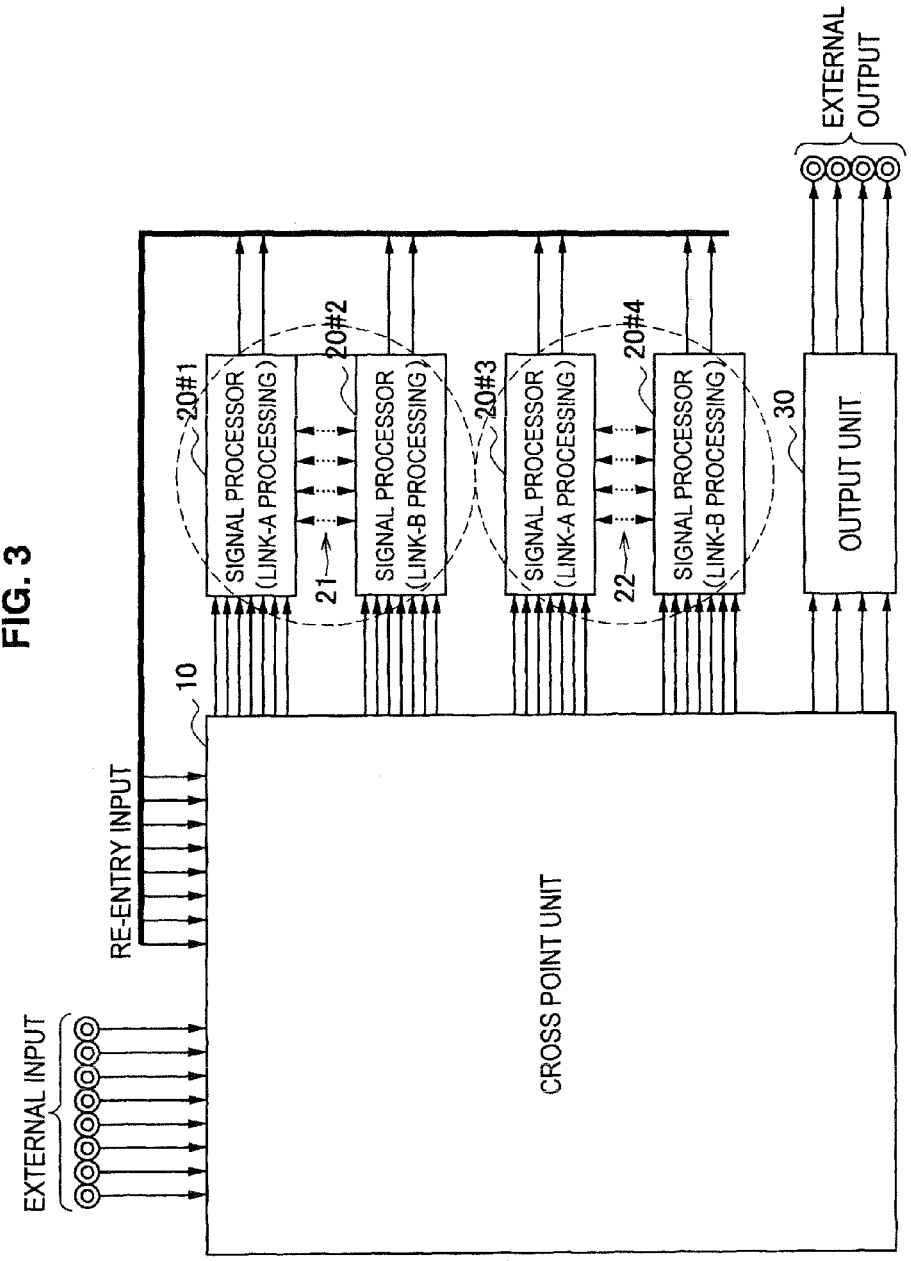
FIG. 3 is an explanatory view showing a function of each signal processor when a progressive video signal is processed by an interlocking operation mode.
Figure 4:
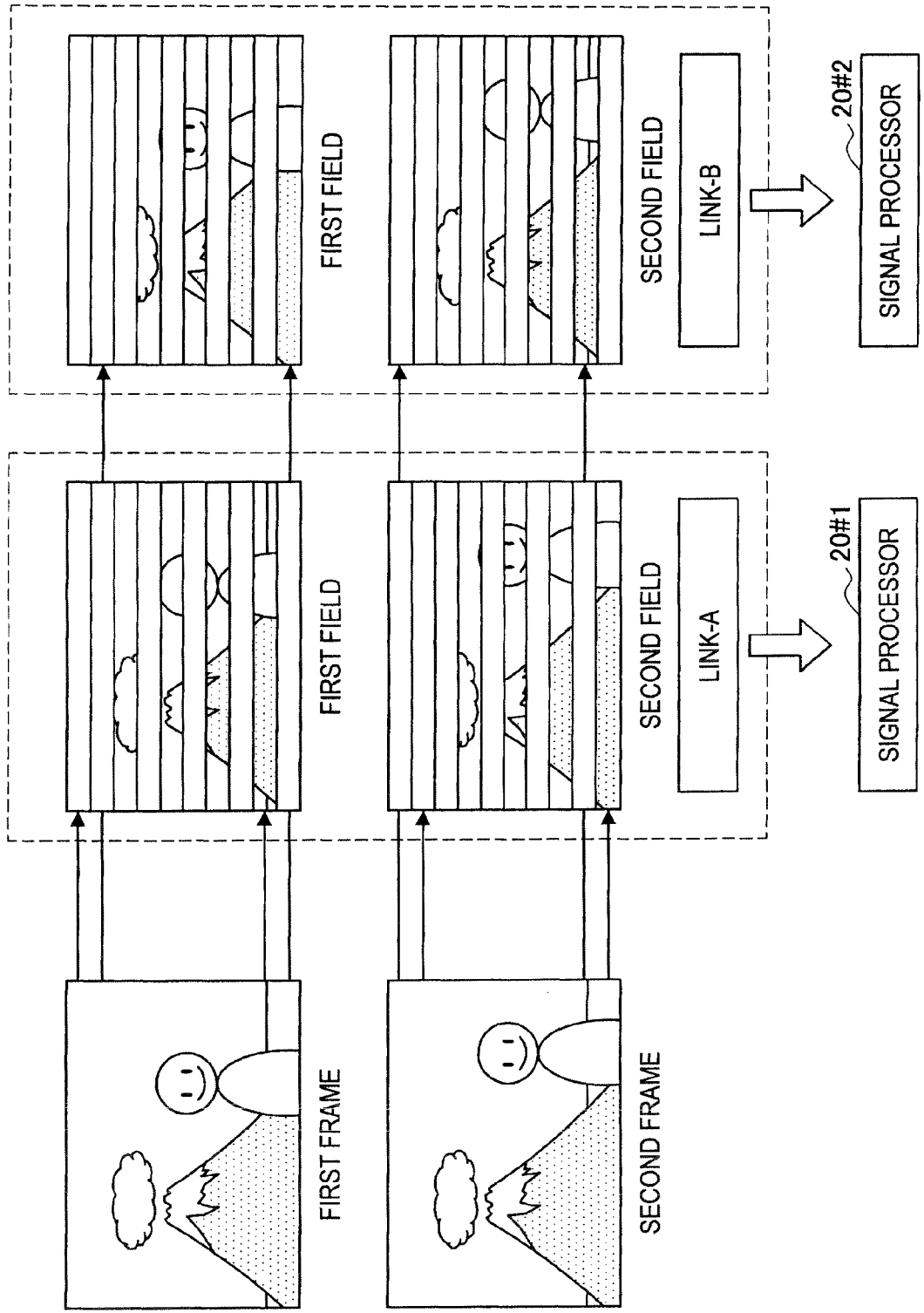
FIG. 4 is an explanatory view showing a video signal supplied to each signal processor when the progressive video signal is processed by the interlocking operation mode.

FIG. 3 is an explanatory view showing a function of each signal processor 20 when the progressive video signal is processed by the interlocking operation mode. The progressive video signal is converted to a dual link constituted of Link-A and Link-B, and processing of Link-A or Link-B is allotted to each signal processor 20.

For example, as shown in FIG. 3, processing of Link-A is allotted to the signal processor 20#1, and processing of Link-B is allotted to the signal processor 20#2. In this case, as shown in FIG. 4, the video signal of Link-A is supplied to the signal processor 20#1, and the video signal of Link-B is supplied to the signal processor 20#2. Then, one video signal is constituted of the Link-A and Link-B, and therefore the signal processor 20#1 and the signal processor 20#2 apply the same signal processing to the Link-A or Link-B. Note that one of the Link-A and Link-B constituting the same frame corresponds to the even-numbered line, and the other one corresponds to the odd-numbered line.

Figure 5:
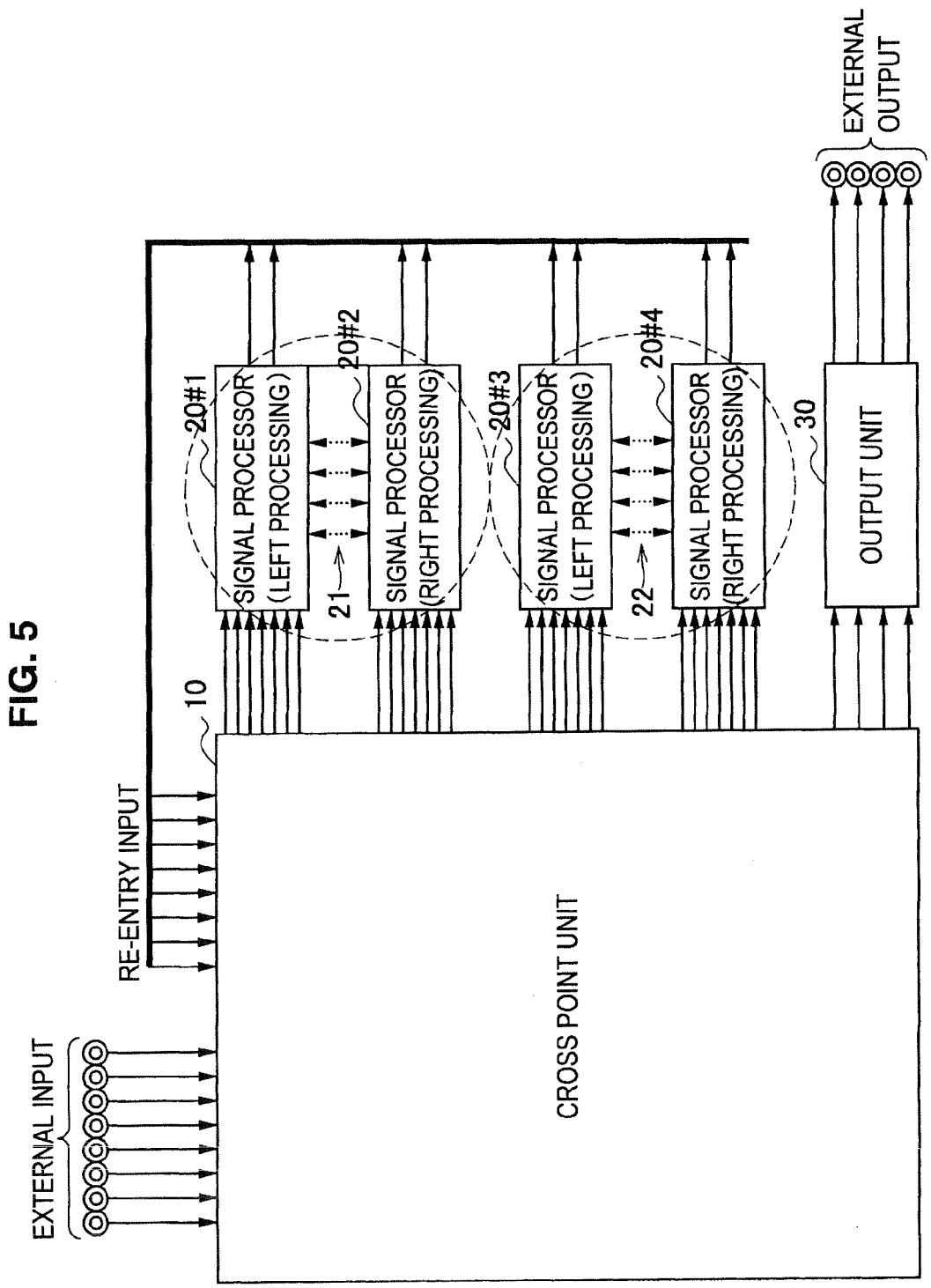
FIG. 5 is an explanatory view showing a function of each signal processor when a three-dimensional video signal is processed by the interlocking operation mode.
Figure 6:
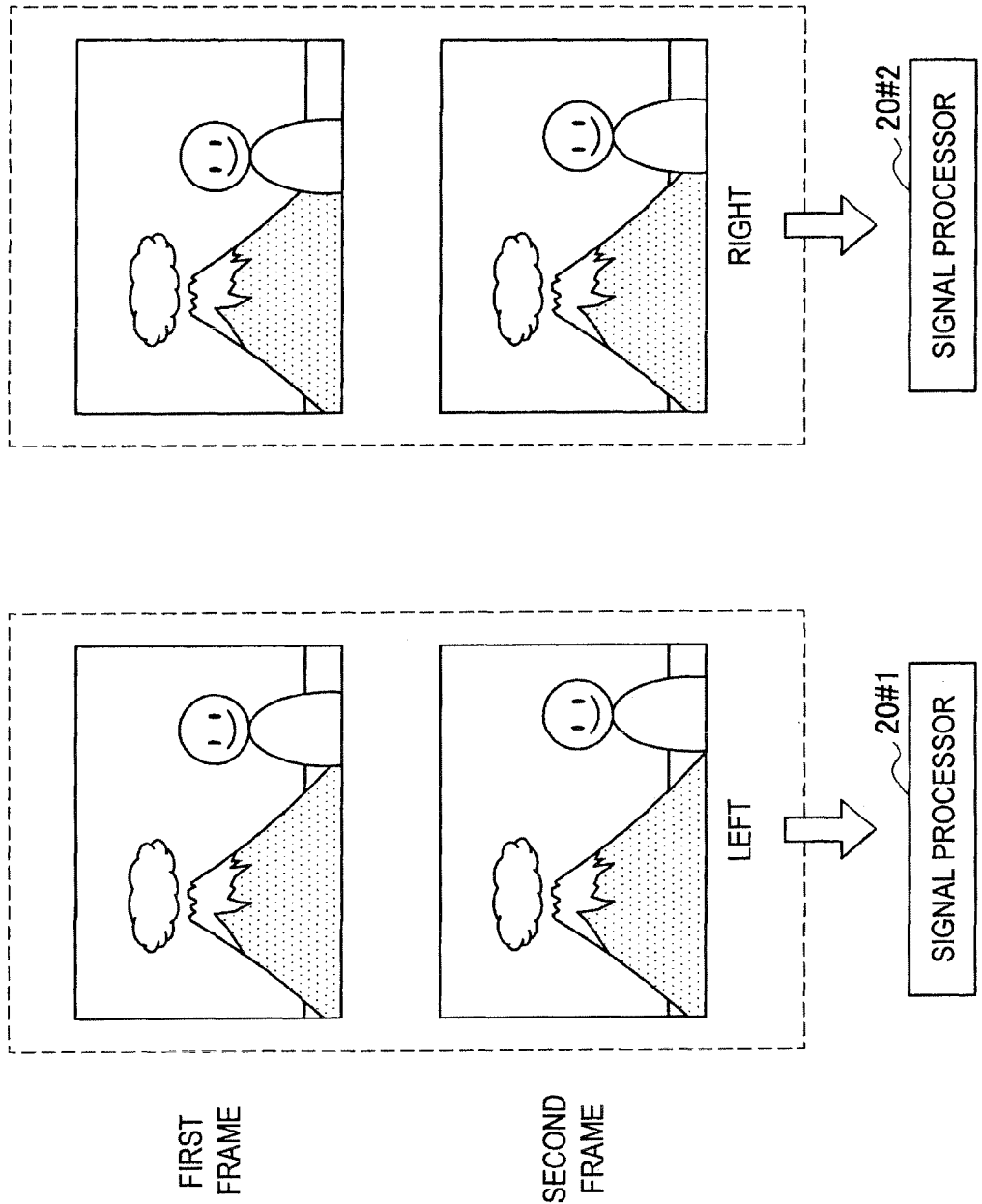
FIG. 6 is an explanatory view showing a video signal supplied to each signal processor when the three-dimensional video signal is processed by the interlocking operation mode.

Further, according to the interlocking operation mode, the three-dimensional video signal can be processed as shown in FIGS. 5 and 6.

FIG. 5 is an explanatory view showing the function of each signal processor 20 when the three-dimensional video signal is processed by the interlocking operation mode. The three-dimensional video signal is constituted of a left signal for a left eye and a right signal for a right eye, and processing of the left signal or the right signal is allotted to each signal processor 20.

For example, as shown in FIG. 5, processing of the left signal is allotted to the signal processor 20#1, and processing of the right signal is allotted to the signal processor 20#2. In this case, as shown in FIG. 6, the left signal is supplied to the signal processor 20#1, and the right signal is supplied to the signal processor 20#2. Then, the signal processor 20#1 and the signal processor 20#2 apply basically the same signal processing to supplied signals.

Thus, according to the interlocking operation mode, by interlocking a plurality of signal processors and simultaneously operating them, a performance of several times of the processing ability (processing speed, signal band) of one signal processor can be obtained. Note that in FIGS. 3 and 5, communication paths 21 and 22 are shown by broken line, but the communication paths 21 and 22 are not utilized in the interlocking operation mode.

(Coupling Operation Mode)

In the aforementioned independent operation mode and interlocking operation mode, the communication paths 21 and 22 between the signal processors 20 are not particularly utilized. However, in the coupling operation mode, the communication paths 21 and 22 play a major role. The coupling operation mode will be specifically described hereafter, with reference to FIGS. 7 and 8.

Figure 7:
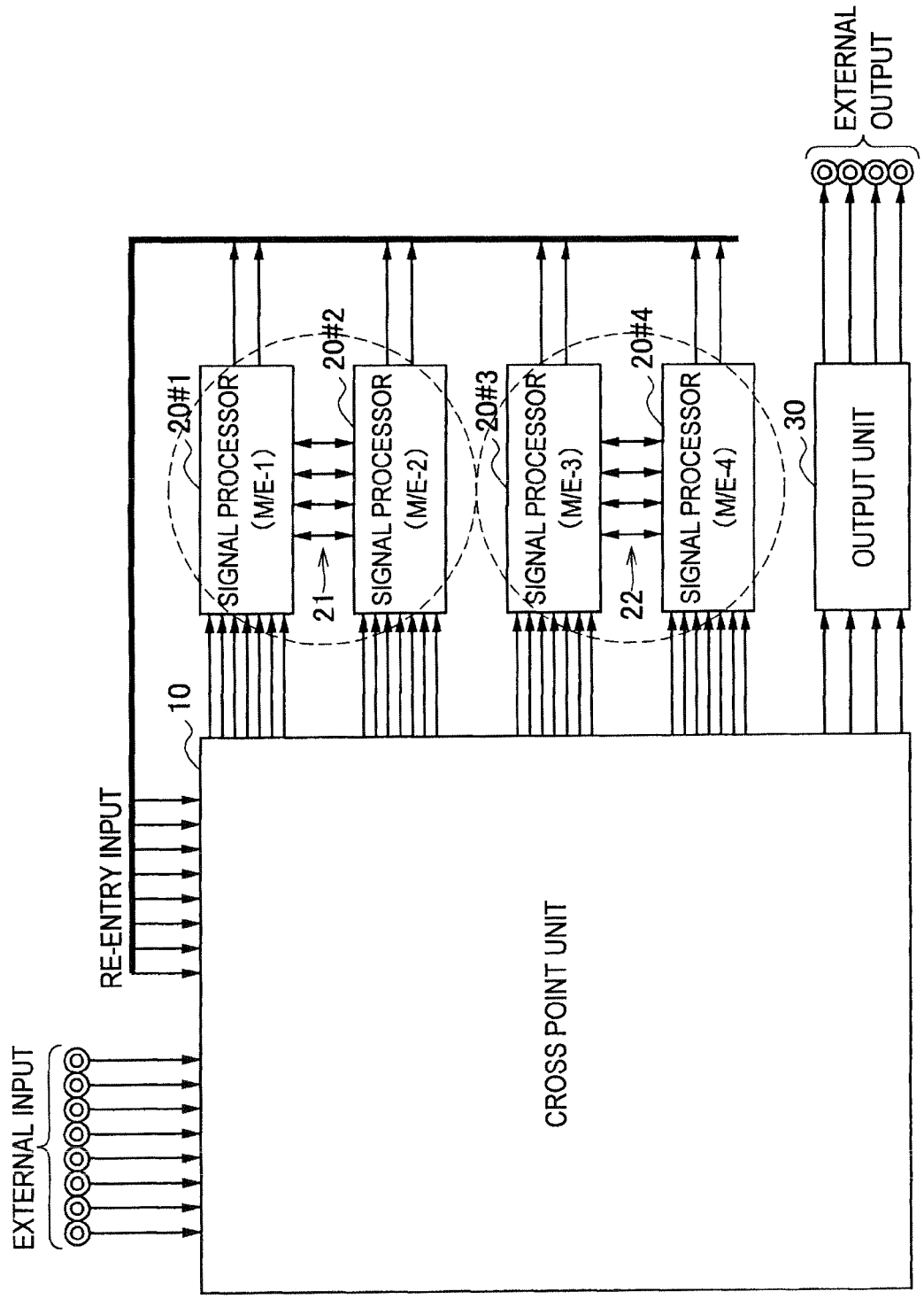
FIG. 7 is an explanatory view showing processing when the signal processor is operated by a coupling operation mode.
Figure 8:
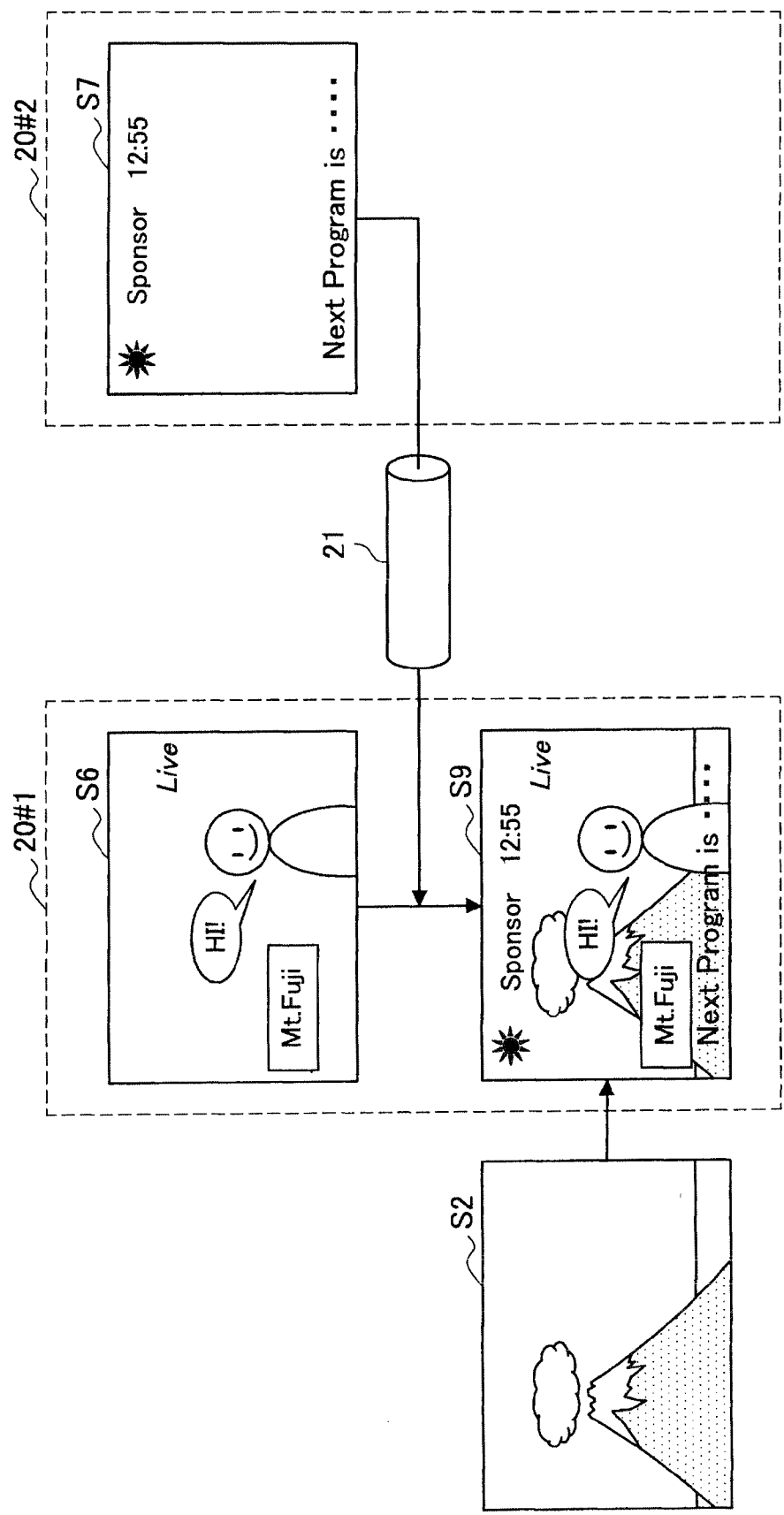
FIG. 8 is an explanatory view showing processing when the signal processor is operated by the coupling operation mode.

FIGS. 7 and 8 are explanatory views showing the processing when the signal processor 20 is operated by the coupling operation mode. In the coupling operation mode, first, as shown in FIG. 8, a plurality of video signals are input into each one of the signal processor 20#1 and the signal processor 20#2, and simultaneously with acquiring a composite video signal S6 by composing the plurality of video signals by the signal processor 20#1, the signal processor 20#2 also composes the plurality of video signals and acquires a composite video signal S7. Then, the signal processor 20#2 supplies the composite video signal S7 to the signal processor 20#1 via the communication path 21.

Subsequently, by composing the composite video signal S6, the composite video signal S7 supplied from the signal processor 20#2 and a background video signal S8, the signal processor 20#1 can acquire a composite video signal S9.

According to such a coupling operation mode, more signals can be composed through single processing. Namely, the number of video signals that can be handled by one signal processor 20 can be doubled. Further, according to the coupling operation mode, a composition result similar to that of the independent operation mode can be obtained, while making the processing time shorter than the processing time of the independent operation mode. The coupling operation mode will be described in detail in the item of "3. Detailed structure of the signal processor of the image processing apparatus".

2. Control for Realizing Each Operation Mode

As described above, content of each operation mode has been described. Subsequently, a control method for realizing each operation mode in the image processing apparatus 1 will be described.

Figure 9:
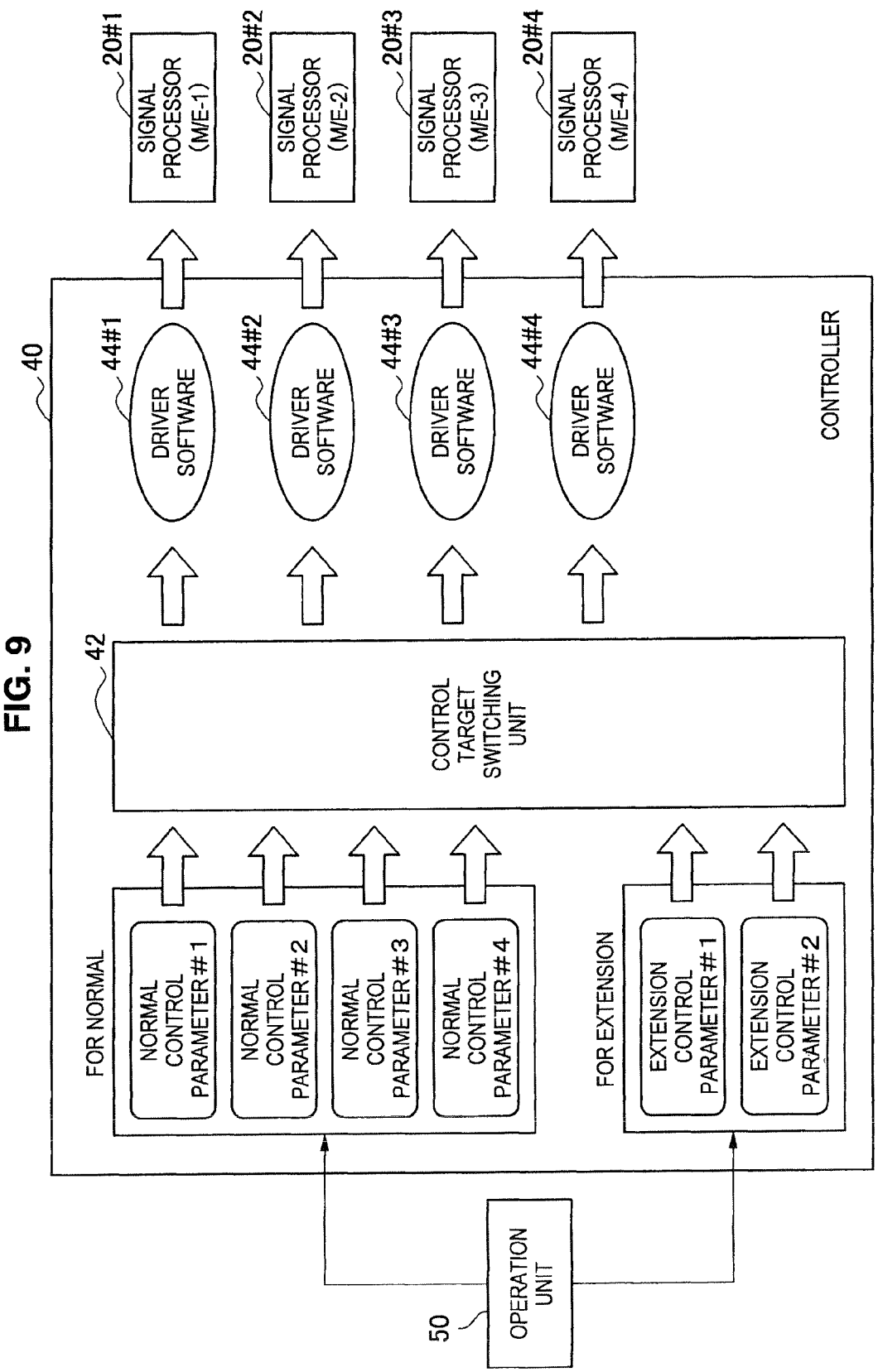
FIG. 9 is an explanatory view showing a structure of a controller.

FIG. 9 is an explanatory view showing a structure of the controller 40. As shown in FIG. 9, the controller 40 generates a control parameter group (normal control parameters #1 to #4, extension control parameters #1, #2) which define the operation of each signal processor 20, based on the operation by a user performed to the operation unit 50. Parameters that define key signals, the type of transition, and the like, can be given as the control parameters, which are updated for each field or each frame.

A control target switching unit 42 switches a supply destination of each control parameter. Driver software 44 converts the control parameter supplied from the control target switching unit 42 to actual circuit control data (register or LUT), and writes the circuit control data into the corresponding signal processor 20. For example, driver software 44#1 converts the control parameter supplied from the control target switching unit 42 to the actual circuit control data, and writes the circuit control data into the signal processor 20#1. Note that functions of the driver softwares 44#1 to 44#4 are basically the same.

A control method performed by the controller 40 for realizing each one of the independent operation mode, the interlocking operation mode, and the coupling operation mode will be described sequentially.

(Independent Operation Mode)

Figure 10:
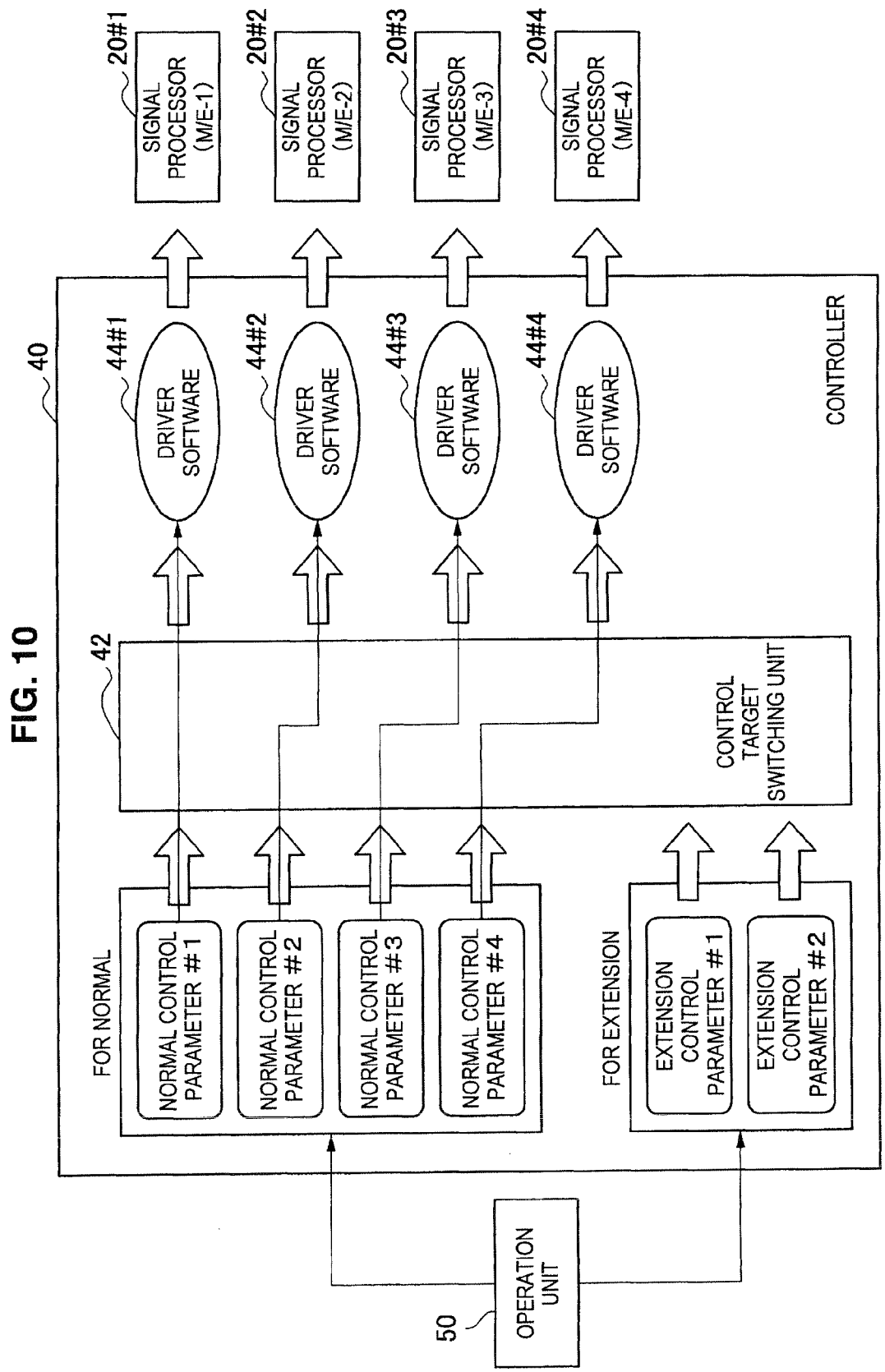
FIG. 10 is an explanatory view showing a control for realizing an independent operation mode.

When the independent operation mode is realized, the controller 40 supplies different normal control parameters to each driver software 44. For example, as shown in FIG. 10, the controller 40 supplies a normal control parameter #1 to the driver software 44#1, supplies a normal control parameter #2 to the driver software 44#2, supplies a normal control parameter #3 to the driver software 44#3, and supplies a normal control parameter #4 to the driver software 44#4.

Thus, each one of the driver softwares 44#1 to 44#4 writes different circuit control data into each signal processor 20, and therefore each signal processor 20 can realize the independent operation mode for performing independent processing.

(Interlocking Operation Mode)

Figure 11:
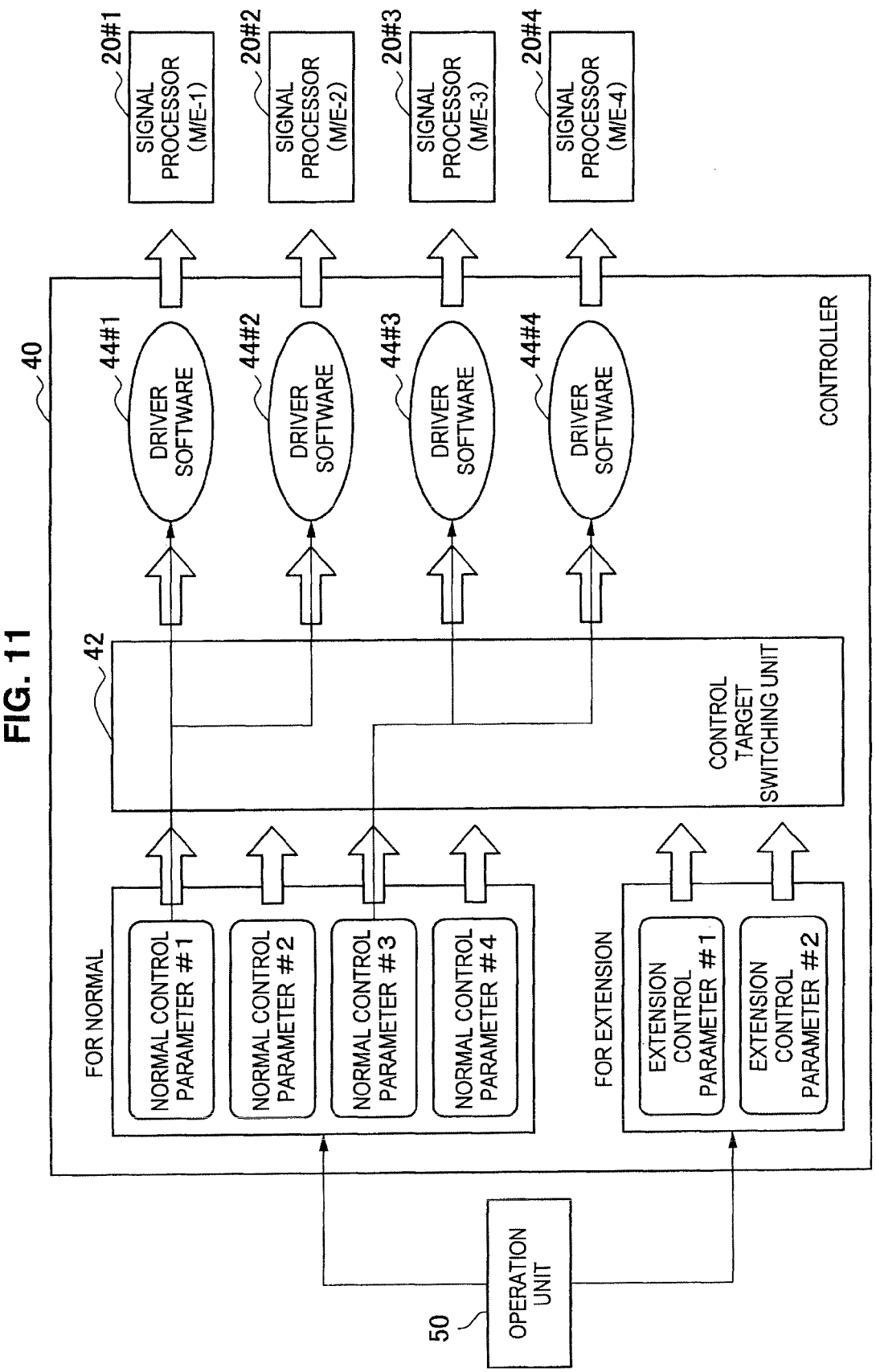
FIG. 11 is an explanatory view showing a control for realizing the interlocking operation mode.

When the independent operation mode is realized, the controller 40 supplies the same normal control parameters to two driver softwares 44. For example, as shown in FIG. 11, the controller 40 supplies the normal control parameter #1 to the driver software 44#1 and the driver software 44#2, supplies the normal control parameter #3 to the driver software 44#3, and supplies the normal control parameter #4 to the driver software 44#4.

Thus, the driver software 44#2 writes into the signal processor 20#2 the same circuit control data as the circuit control data written into the signal processor 20#1 by the driver software 44#1, thus realizing the interlocking operation mode in which the signal processor 20#1 and the signal processor 20#2 perform the same processing.

(Coupling Operation Mode)

When the coupling operation mode is realized, the controller 40 supplies normal control parameters (such as KEY1 to KEY4) to a driver software corresponding to one of the coupled two signal processors, and supplies extension control parameters (such as KEY5 to KEY8) to a driver software corresponding to the other one.

Figure 12:
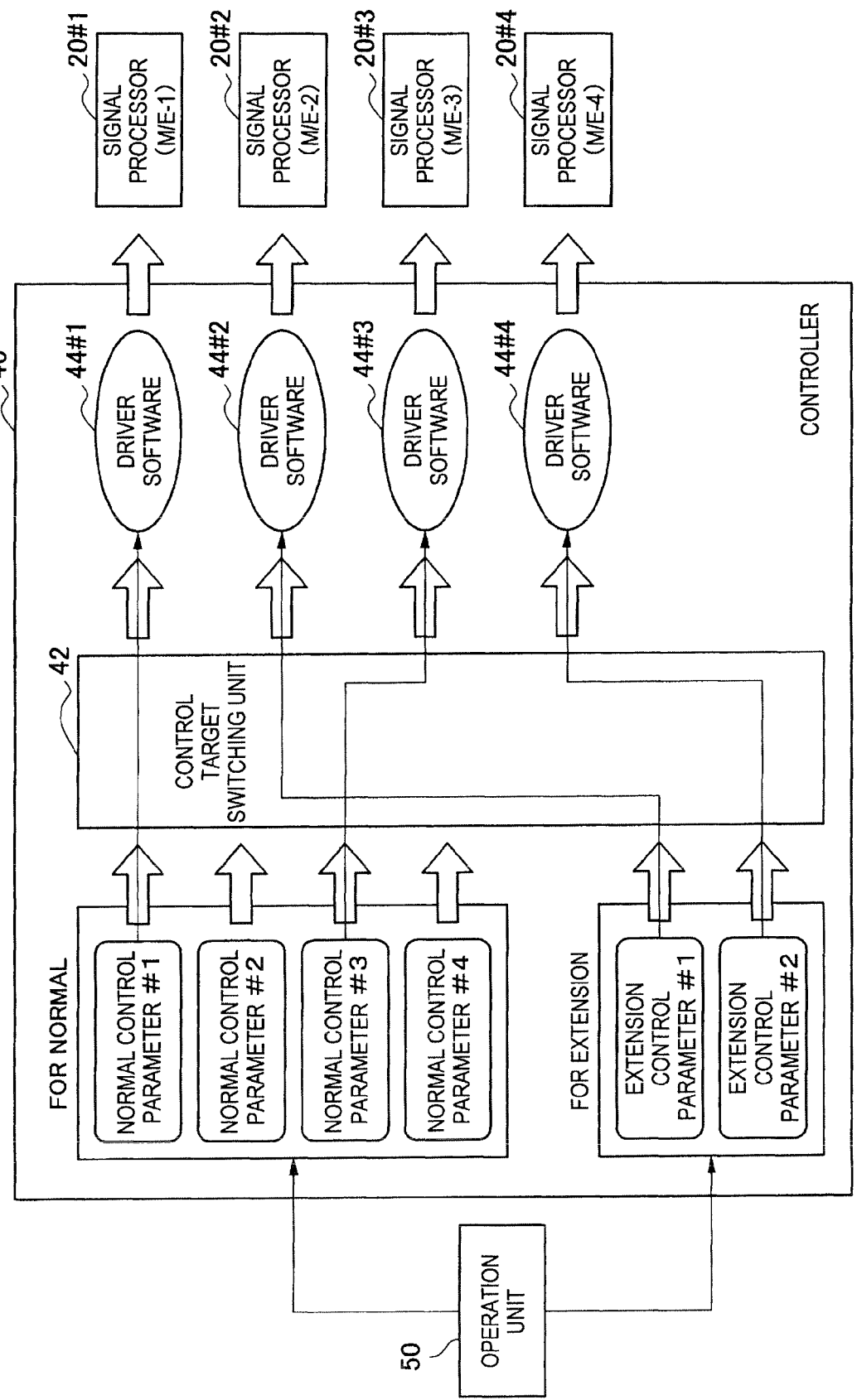
FIG. 12 is an explanatory view showing a control for realizing the coupling operation mode.

Specifically, as shown in FIG. 12, the controller 40 supplies the normal control parameter #1 to the driver software 44#1 corresponding to the signal processor 20#1. Further, the controller 40 supplies the extension control parameter #1 to the driver software 44#2 corresponding to the signal processor 20#2 coupled to the signal processor 20#1. Similarly, the controller 40 supplies the normal control parameter #3 to the driver software 44#3 corresponding to the signal processor 20#3. Further, the controller 40 supplies the extension control parameter #2 to the driver software 44#4 corresponding to the signal processor 20#4 coupled to the signal processor 20#3. Thus, the coupling operation mode can be realized.

As described above, according to the embodiment of the present invention, the operation mode can be switched by switching parameters supplied to the driver software 44 of a higher-order side of the control. Therefore, efficiency of an overall control system can be achieved.

3. Detailed Structure of the Signal Processor of the Image Processing Apparatus

As described above, the structure of the image processing apparatus 1 and the control method for realizing each operation mode have been described. Subsequently, based on FIGS. 13 to 15, a detailed structure of the signal processor 20 will be described and thereafter the processing of the signal processor 20 by the coupling operation mode will be specifically described.

Figure 13:
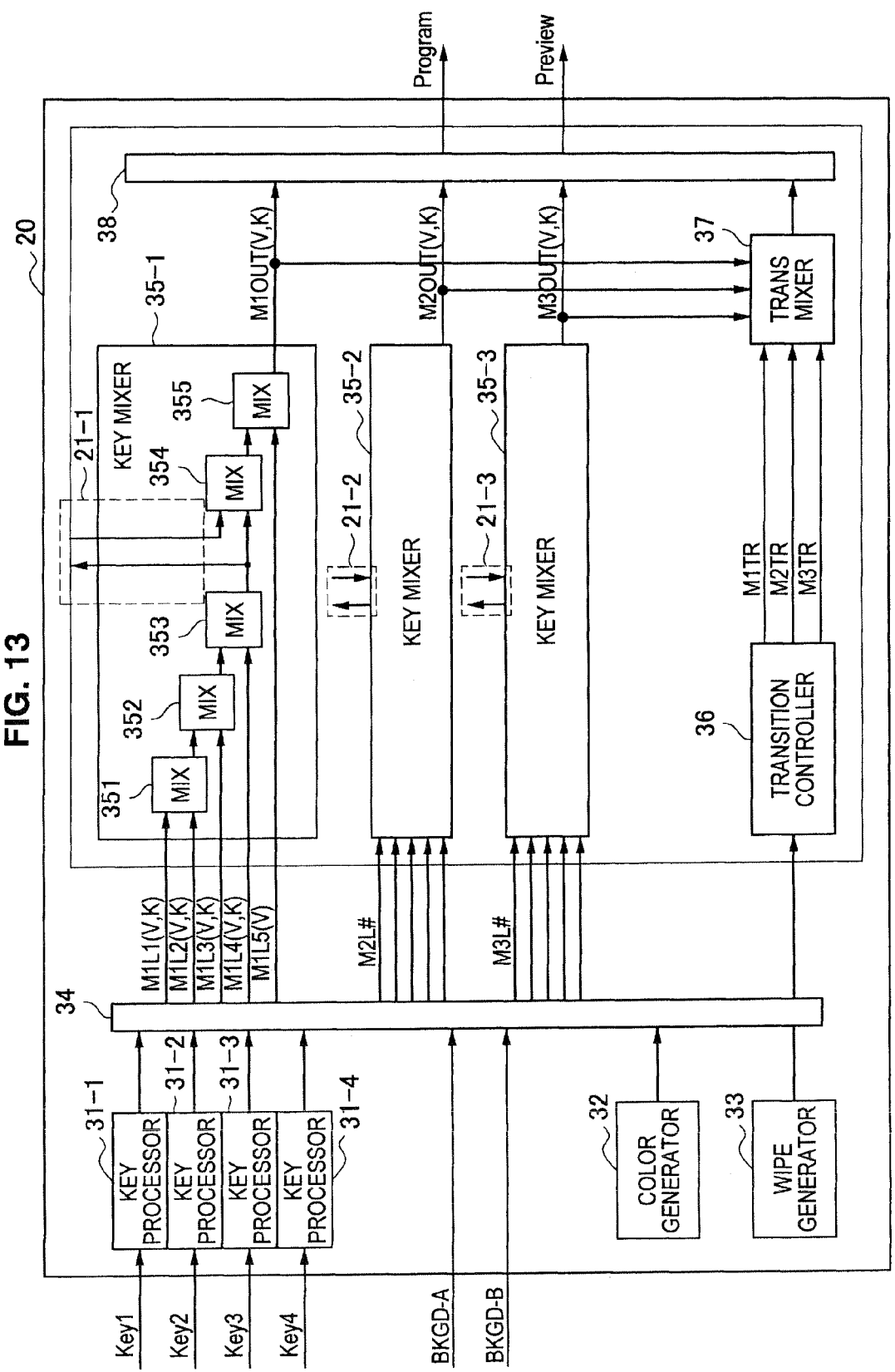
FIG. 13 is an explanatory view showing structures of signal processors of the image processing apparatus.

FIG. 13 is an explanatory view showing the structure of the signal processor 20 of the image processing apparatus 1. As shown in FIG. 13, the signal processor 20 includes key processors 31-1 to 31-4, a color generator 32, a wipe generator 33, a source selector 34, key mixers 35-1 to 35-3, a transition controller 36, a transmixer 37, and an output selector 38.

A key signal and a video signal are input into each key processor 31, and each key processor 31 applies key signal processing thereto, for segmenting the video signal into a shape of the key signal. Then, each key processor 31 outputs to the source selector 34 a layer signal constituted of the key signal and a material signal (the video signal segmented into the shape of the key signal).

The color generator 32 generates a color signal used for a background video signal or a wipe border signal. The wipe generator 33 generates a wipe signal used for transition.

The source selector 34 selects signals used for composition from the input layer signals or background video signals according to an order of superimposing the signals, and supplies the selected signals to the key mixer 35.

Each key mixer 35 composes the signals selected by the source selector 34 one by one, according to an order of selection selected by the source selector 34. The key mixer 35 includes mix circuits 351 to 355. The mix circuits 351 to 353 (first video composition units) perform superimposing composition of layer signals L1 (V, K) to L4 (V, K) selected by the source selector 34. Then, in the coupling operation mode, the mix circuit 354 (second video composition unit) composes composite video signals supplied from other signal processor via the communication path 21, and output signals from the mix circuit 353. Further, the mix circuit 355 composes output signals from the mix circuit 354 and background video signals. A detailed structure of the key mixer 35 will be described later with reference to FIGS. 14 and 15.

The transition controller 36 generates a transition signal multiplied to the output signals from each key mixer 35, according to the type of transition and an operation status (fader value). The transmixer 37 composes the output signals from each key mixer 35 into one, in accordance with the transition signals generated by the transition controller 36. The output signals from each key mixer 35 and the output signals from the transmixer 37 are input into the output selector 38, and the output selector 38 selects a signal output to a view or a program, in accordance with the operation status.

Figure 14:
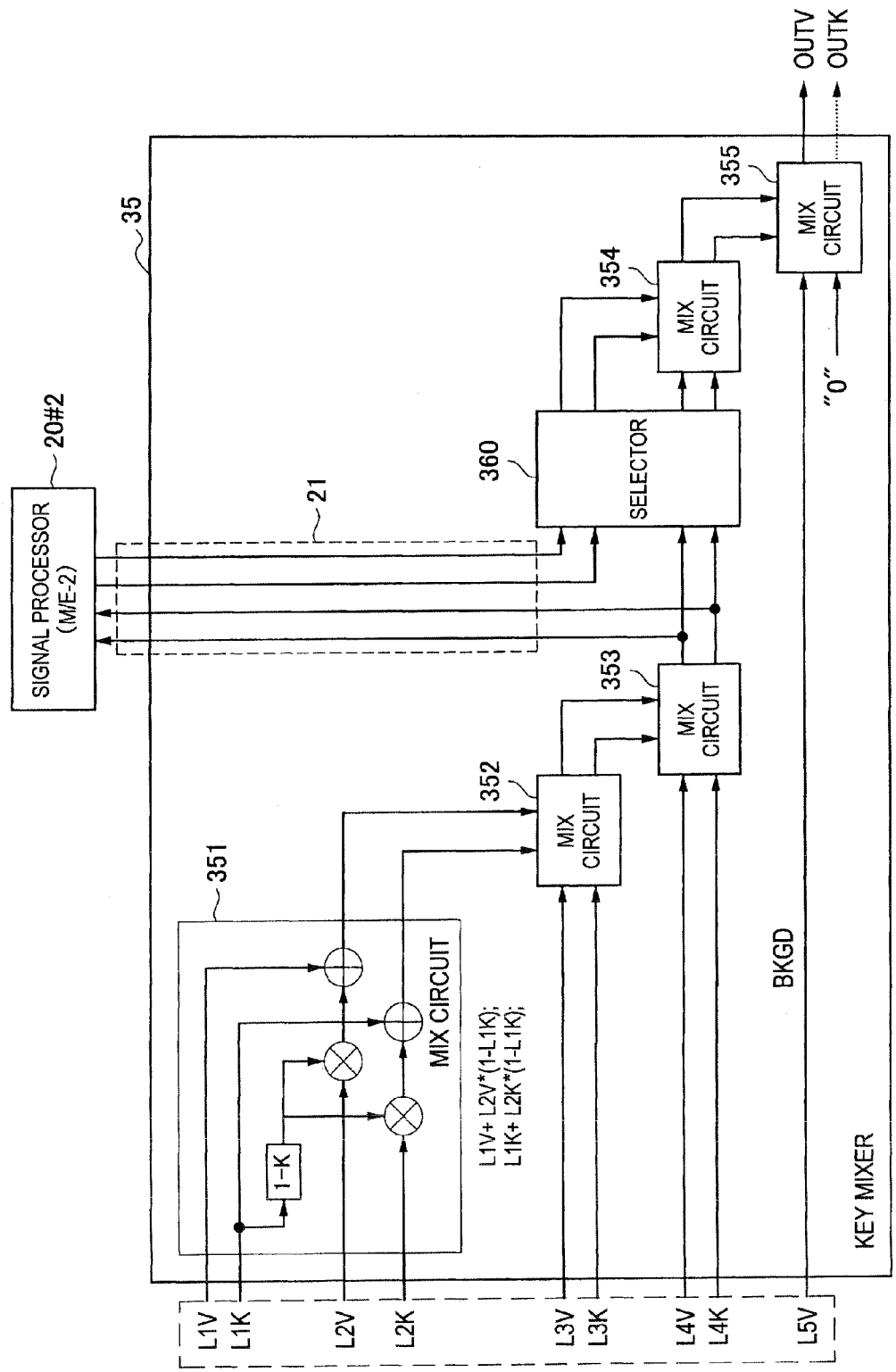
FIG. 14 is an explanatory view showing a detailed structure of a key mixer.
Figure 15:
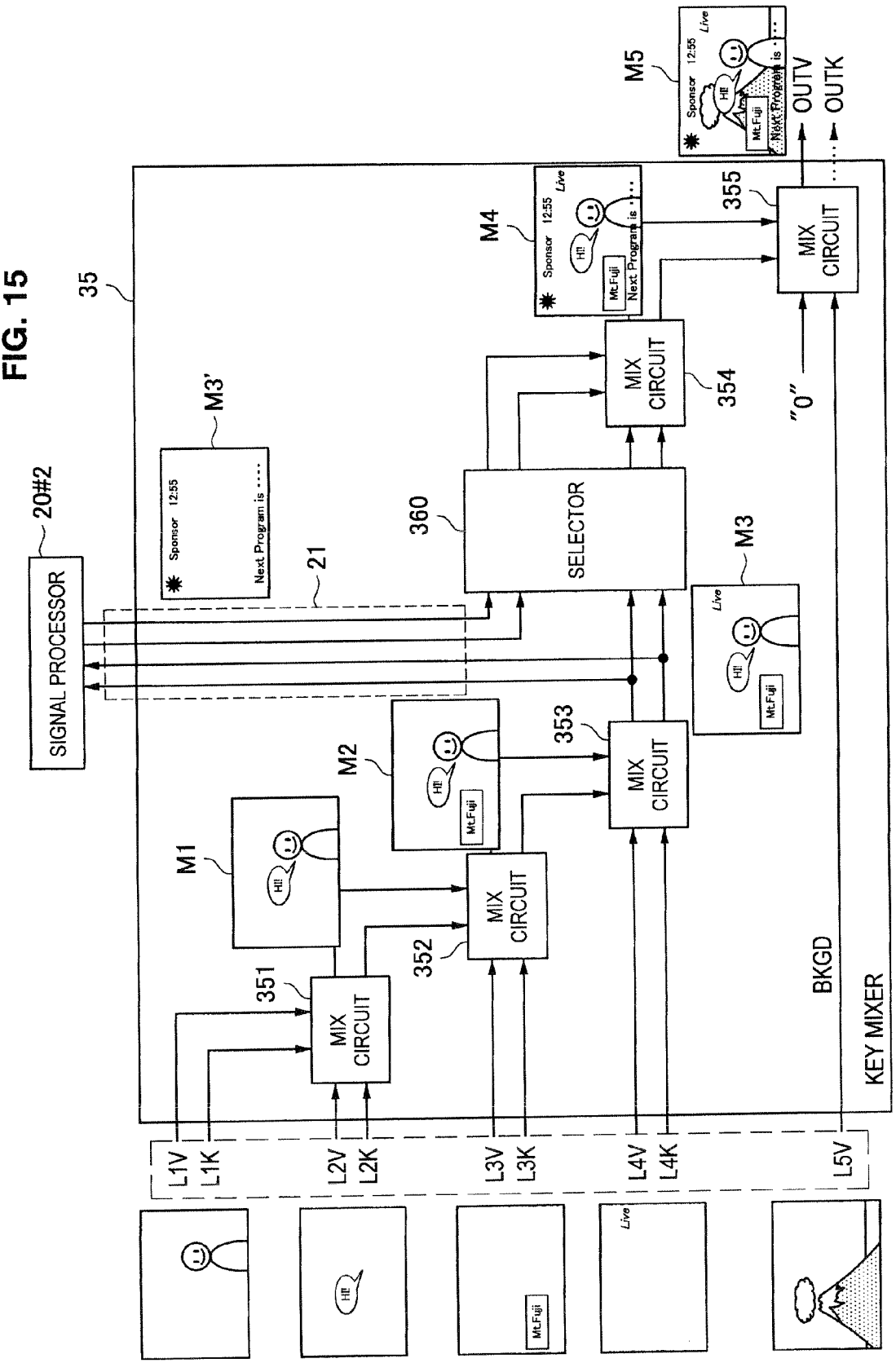
FIG. 15 is an explanatory view showing a specific example of processing by the key mixer in the coupling operation mode.

Here, the key mixer 35 will be described in further detail, with reference to FIGS. 14 and 15. FIG. 14 is an explanatory view showing a detailed structure of the key mixer 35. FIG. 15 is an explanatory view showing a specific example of processing by the key mixer 35 in the coupling operation mode.

As shown in FIGS. 14 and 15, the key mixer 35 includes the mix circuits 351 to 355 and a selector 360. Further, a material signal L1V of a first layer to a material signal L4V of a fourth layer, a key signal L1K of the first layer to a key signal L4K of the fourth layer, and a background video signal L5V of a fifth layer are input into the key mixer 35.

More specifically, the material signal L1V of the first layer, the key signal L1K of the first layer, the material signal L2V of the second layer, and the key signal L2K of the second layer are input into the mix circuit 351. Then, the mix circuit 351 acquires a composite video signal M1 shown in FIG. 15 and a composite key signal by performing processing based on the formula as described below. Note that in FIG. 15, only the material signal is shown, and the description of the key signal (having the same shape as the material signal) is omitted.

Composite video signal L1V+L2V*(1−L1K)
Composite key signal L1K+L2K*(1−L1K)

Into the mix circuit 352, the material signal L3V and the key signal L3K of the third layer are input from the source selector 34, and the composite video signal M1 and the composite key signal are input from the mix circuit 351. Then, by performing processing similar to the processing of the mix circuit 351, the mix circuit 352 acquires a composite video signal M2 shown in FIG. 15 and the composite key signal.

Into the mix circuit 353, the material signal L4V and the key signal L4K of the fourth layer are input from the source selector 34, and the composite video signal M2 and the composite key signal are input from the mix circuit 352. Then, the mix circuit 353 acquires a composite video signal M3 shown in FIG. 15 and the composite key signal by performing processing similar to the processing of the mix circuit 351.

Meanwhile, in the coupling operation mode, a composite video signal M3' shown in FIG. 15 and the composite key signal are also generated by the key mixer 35 of other signal processor 20#2, and such composite video signal M3' and composite key signal are supplied to the selector 360 via the communication path 21.

The selector 360 selects a hierarchical relation between the composite video signal M3' supplied via the communication path 21 and the composite video signal M3 input from the mix circuit 353, based on the control of the controller 40. Then, the selector 360 supplies each signal to the mix circuit 354, so as to realize the selected hierarchical relation. Note that in the independent operation mode and in the interlocking operation mode, the selector 360 supplies to the mix circuit 354 only the output signals output from the mix circuit 353.

Into the mix circuit 354, the composite video signal M3 and the composite key signal generated by the mix circuit 353, and the composite video signal M3' and the composite key signal generated by other signal processor 20#2 are input through the selector 360. Then, the mix circuit 354 acquires a composite video signal M4 shown in FIG. 15 and the composite key signal by performing composition processing in accordance with the hierarchical relation selected by the selector 360. Note that FIG. 15 shows an example of performing composition processing so that the composite video signal M3' is disposed at an upper side (front surface) of the composite video signal M3.

Into the mix circuit 355, the background video signal L5V of the fifth layer is input from the source selector 34, and the composite video signal M4 and the composite key signal are input from the mix circuit 354. Then, the mix circuit 355 acquires and outputs a composite video signal M5 shown in FIG. 15 and the composite key signal by performing composition processing so that the background video signal L5V is disposed on a back side of the composite video signal M4.

4. Operation of the Image Processing Apparatus

As described above, the processing by the key mixer 35 of the signal processor 20 has been described in detail. The operation of the image processing apparatus 1 will be described hereafter with reference to FIG. 16.

Figure 16:
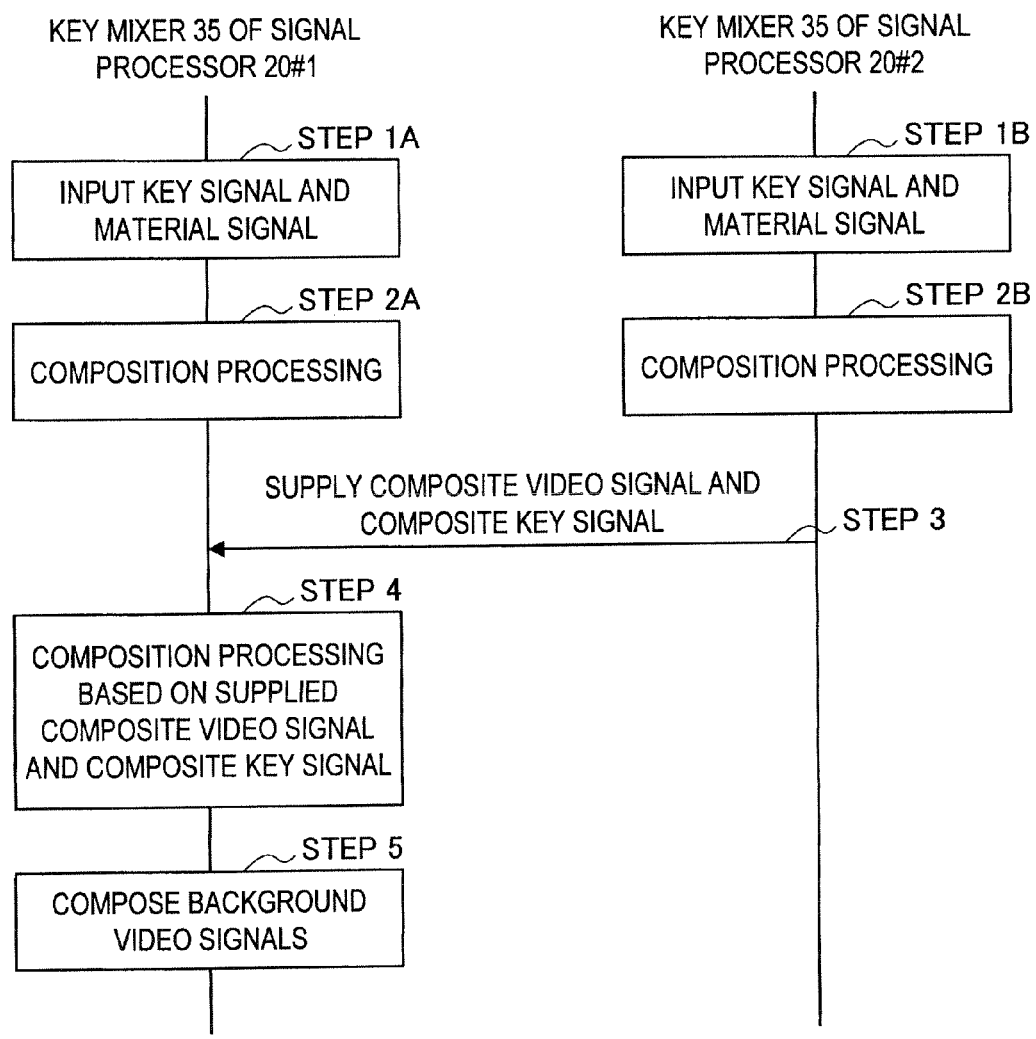
FIG. 16 is a sequence view showing an operation of the image processing apparatus.

FIG. 16 is a sequence view showing the operation of the image processing apparatus 1. As shown in FIG. 16, first, a plurality of key signals and material signals are input into the key mixer 35 of the signal processor 20#1 of the image processing apparatus 1, and the key mixer 35 of the signal processor 20#2 of the image processing apparatus 1 (step 1A, step 1B). For example, key signals of KEY1 to KEY4 are input into the key mixer 35 of the signal processor 20#1, and key signals of KEY5 to KEY8 are input into the key mixer 35 of the signal processor 20#2.

Thereafter, each one of the key mixer 35 of the signal processor 20#1 and the key mixer 35 of the signal processor 20#2 composes the input material signal and key signal, to thereby generate the composite video signal and the composite key signal (step 2A, step 2B).

Subsequently, the signal processor 20#2 supplies the composite video signal and the composite key signal generated by the key mixer 35 of the signal processor 20#2, to the signal processor 20#1 via the communication path 21 (step 3).

Then, the key mixer 35 of the signal processor 20#1 composes the composite video signal and the composite key signal generated in step 2A, and the composite video signal and the composite key signal supplied from the signal processor 20#2 in step 3 (step 4). Further, the key mixer 35 of the signal processor 20#1 composes the composite video signal obtained in step 4 and the background video signal (step 5).

5. Conclusion

As described above, the image processing apparatus 1 according to the embodiment of the present invention includes the communication paths 21, 22 for connecting a plurality of signal processors 20, and by utilizing the communication paths 21 and 22, the coupling operation mode can be realized. According to the coupling operation mode, the composite video signal obtained by composition by other signal processor 20 is supplied to a certain signal processor 20 via the communication paths 21, 22, and the signal processor 20 composes the composite video signal composed by itself and the composite video signal supplied via the communication paths 21, 22.

According to such a coupling operation mode, more signals can be composed through single processing. Namely, the number of video signals that can be handled by one signal processor 20 can be doubled while shortening the processing time. Further, the signal processor 20 can compose video signals by selecting the hierarchical relation between the composite video signal composed by itself and the composite video signal supplied via the communication paths 21, 22.

The image processing apparatus 1 according to the embodiment of the present invention can suitably switch the operation mode to other operation mode, such as the coupling operation mode, the independent operation mode, and the interlocking operation mode, according to purposes and uses.

It should be understood by those skilled in the art that various modifications, combinations, sub-combinations and alterations may occur depending on design requirements and other factors insofar as they are within the scope of the appended claims or the equivalents thereof.

For example, each step in the processing of the image processing system 1 of this specification is not necessarily processed in time sequence in the order as described in a sequence view. For example, each step of the processing of the image processing system 1 may be processed in an order different from the order described in the sequence view, or may be processed in parallel.

Further, explanation has been given by mainly focusing on an example of coupling the signal processor 20#1 and the signal processor 20#2. However, the signal processor 20#3 and the signal processor 20#4 can also be coupled similarly.

Further, the coupling operation mode and the interlocking operation mode may be simultaneously realized. For example, the signal processor 20#1 and the signal processor 20#2 are coupled, and the signal processor 20#3 and the signal processor 20#4 are coupled, and in this state, Link-A may be allotted to the signal processor 20#1 and the signal processor 20#2, and Link-B may be allotted to the signal processor 20#3 and the signal processor 20#4. Similarly, the signal processor 20#1 and the signal processor 20#2 are coupled, and the signal processor 20#3 and the signal processor 20#4 are coupled, and in this state, left signals may be allotted to the signal processor 20#1 and the signal processor 20#2, and right signals may be allotted to the signal processor 20#3 and the signal processor 20#4.

The present application contains subject matter related to that disclosed in Japanese Priority Patent Application JP 2010-089812 filed in the Japan Patent Office on Apr. 8, 2010, the entire content of which is hereby incorporated by reference.

What is claimed is:

1. An image processing apparatus comprising:
   a first plurality of signal processing circuits and a second plurality of signal processing circuits that compose video signals, each of the first and second plurality of signal processing circuits comprising a first video composition unit, a second video composition unit coupled in series with the first video composition unit, and a third video composition unit coupled in series with the second video composition unit; and
   a communication path that connects the first plurality of signal processing circuits, wherein the second video composition unit composes a composite video signal based on a first video signal composed by the first video composition unit and a second video signal composed by another signal processing circuit of the first plurality of signal processing circuits and supplied from the another signal processing circuit via the communication path, wherein the third video composition unit coupled to the second video composition unit composes a third video signal using the composite video signal and a background video signal.

2. The image processing apparatus according to claim 1, further comprising a controller that controls an operation of the first and second plurality of signal processing circuits, wherein the controller switches operation modes of the first and second plurality of signal processing circuits to other operation mode, wherein the other operation mode comprises a coupling operation mode, wherein each of the first and second plurality of signal processing circuits composes the second video signal supplied from the another signal processing circuit in the coupling operation mode.

3. The image processing apparatus according to claim 2, wherein the other operation mode comprises an independent operation mode in which each one of the first and second plurality of signal processing circuits composes video signals independently.

4. The image processing apparatus according to claim 2, wherein the other operation mode comprises an interlocking operation mode in which different signal processing circuits respectively perform processing of a video signal corresponding to an odd-numbered line that constitutes a frame, and processing of a video signal corresponding to an even-numbered line that constitutes the frame.

5. The image processing apparatus according to claim 2, wherein the other operation mode comprises a three-dimensional interlocking operation mode in which different signal processing circuits respectively perform processing of a left eye signal and processing of a right eye signal in three-dimensional video signals.

6. The image processing apparatus according to claim 2, wherein the controller specifies a composition method performed by the second video composition unit, for composing the composite video signal based on the first video signal composed by the first video composition unit and the second video signal supplied from the another signal processing circuit via the communication path.

7. The image processing apparatus according to claim 1, further comprising a cross point unit into which a plurality of video signals from the first plurality of signal processing circuits are input and out of which each one of the plurality of video signals is output to one of the second plurality of signal processing circuits.

8. The image processing apparatus according to claim 1, wherein the composite video signal output from the first plurality of signal processing circuits is selected and input to the second plurality of signal processing circuits for executing subsequent processing on the composite video signal.

9. The image processing apparatus according to claim 1, wherein the second video composition unit composes the composite video signal using a segmented input video signal.

10. The image processing apparatus according to claim 1, wherein each of the first video composition unit and second video composition unit compose the first video signal and the composite video signal respectively based on an order selected by a selector.

11. The image processing apparatus according to claim 1, wherein a plurality of key signals and a plurality of video signals are input to each of the first and second plurality of signal processing circuits.

12. The image processing apparatus according to claim 1, wherein each of the first and second plurality of signal processing circuits segments an input video signal into one or more layer signals based on one of a plurality of key signals to compose the first and second video signals.

13. An image processing method comprising:
   composing video signals by a first plurality of signal processing circuits and a second plurality of signal processing circuits, wherein each of the first and second plurality of signal processing circuits comprises a first video composition, a second video composition unit coupled in series with the first video composition unit, and a third video composition unit coupled in series with the second video composition unit;
   composing, by the second video composition unit, a composite video signal based on a first video signal composed by the first video composition unit and a second video signal supplied from another signal processing circuit via a communication path; and composing, by the third video composition unit, a third video signal using the composite video signal and a background video signal.

14. The image processing method according to claim 13, wherein the second plurality of signal processing circuits receive a plurality of video signals from a cross point unit, wherein the plurality of video signals are received by the cross point unit and out of which each one of the plurality of video signals is output to one of the second plurality of signal processing circuits.

15. An image processing system comprising:
a first plurality of signal processing circuits and a second plurality of signal processing circuits that compose video signals, wherein each of the first and second plurality of signal processing circuits comprises a first video composition, a second video composition unit coupled in series with the first video composition unit, and a third video composition unit coupled in series with the second video composition unit;
a communication path that connects the first plurality of signal processing circuits; and
a cross point unit into which a plurality of video signals from the first plurality of signal processing circuits are input and out of which each one of the plurality of video signals is output to one of the second plurality of signal processing circuits, wherein the second video composition unit composes a composite video signal based on a first video signal composed by the first video composition unit and a second video signal composed by another signal processing circuit, the second video signal supplied from the another signal processing circuit via the communication path, wherein the third video composition unit composes a third video signal using the composite video signal and a background video signal.

16. The image processing system according to claim 15, wherein the composite video signal output from the first plurality of signal processing circuits is selected and input to the second plurality of signal processing circuits through the cross point unit.

* * * * *